(12) United States Patent
Kent, Jr. et al.

(10) Patent No.: US 8,555,320 B2
(45) Date of Patent: Oct. 8, 2013

(54) SYSTEM AND METHOD TO RECORD MEDIA CONTENT

(75) Inventors: Larry G. Kent, Jr., Loganville, GA (US); Brian K. Daigle, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 320 days.

(21) Appl. No.: 12/276,155

(22) Filed: Nov. 21, 2008

(65) Prior Publication Data

US 2010/0131987 A1 May 27, 2010

(51) Int. Cl.
*G06F 3/00* (2006.01)

(52) U.S. Cl.
USPC .......................................................... 725/53

(58) Field of Classification Search
USPC .................................... 725/37–40, 44–45, 53
See application file for complete search history.

(56) References Cited

U.S. PATENT DOCUMENTS

| | | | |
|---|---|---|---|
| 7,082,254 B1 * | 7/2006 | Rashkovskiy et al. | 386/291 |
| 7,380,260 B1 | 5/2008 | Billmaier et al. | |
| 7,885,963 B2 * | 2/2011 | Sanders | 707/750 |
| 2002/0174430 A1 * | 11/2002 | Ellis et al. | 725/46 |
| 2003/0014752 A1 * | 1/2003 | Zaslavsky et al. | 725/40 |
| 2004/0187164 A1 * | 9/2004 | Kandasamy et al. | 725/132 |
| 2005/0273819 A1 * | 12/2005 | Knudson et al. | 725/58 |
| 2006/0041927 A1 * | 2/2006 | Stark et al. | 725/139 |
| 2007/0122108 A1 * | 5/2007 | Bontempi | 386/83 |
| 2007/0157249 A1 | 7/2007 | Cordray et al. | |
| 2009/0133078 A1 * | 5/2009 | Hamano et al. | 725/87 |
| 2009/0158350 A1 * | 6/2009 | DeCamp | 725/58 |
| 2010/0175090 A1 * | 7/2010 | Cordray | 725/58 |
| 2010/0284671 A1 * | 11/2010 | Goodwin et al. | 386/297 |

* cited by examiner

*Primary Examiner* — Jason J Chung
*Assistant Examiner* — Alfonso Castro
(74) *Attorney, Agent, or Firm* — Toler Law Group, PC

(57) ABSTRACT

Systems and methods of recording media content are provided. A particular method includes accessing user configuration settings. The user configuration settings include at least one premier recording option. Selection of the premier recording option indicates that initial episodes of series programs are to be recorded. The method also includes searching electronic program guide (EPG) information for the initial episodes of series programs in response to determining that the premier recording option is selected in the user configuration settings. The method further includes storing a data record scheduling recording of a particular initial episode of a particular series program identified by searching the EPG information.

23 Claims, 5 Drawing Sheets

500

| RECORDED PROGRAM LIST | | | |
|---|---|---|---|
| Title | Genre | Program information | 526 |
| The Office | Comedy | Season 5, episode 66: "Weight Loss" | |
| Heroes | Drama/sci-fi | Season 3, episode 35 (season premier) | |
| Fringe | Sci-fi | Season 1, episode 1: "Pilot" — 520 | |
| Oprah's Big Give | Reality | Season 1, episode 1 (pilot) | |

502 — The Office
504 — Heroes
506 — Fringe
508 — Oprah's Big Give 522, 524

FIG. 5

SYSTEM AND METHOD TO RECORD MEDIA CONTENT

FIELD OF THE DISCLOSURE

The present disclosure is generally related to systems and methods of recording media content.

BACKGROUND

A media recording device, such as digital video recorder (DVR) or personal video recorder (PVR) may enable a user to record particular media content for later viewing. The media recording device may allow the user to specify that a particular program (e.g., a program that is scheduled to air at a particular time or on a particular date) is to be scheduled for recording. However, if the user desires to broaden his exposure to media content by viewing new programs or different types of programs, it may be difficult for the user to identify to the media recording device which programs to schedule for recording.

BRIEF DESCRIPTION OF THE DRAWINGS

FIG. 5 is an illustration of a third embodiment of a user interface display to record media content.

DETAILED DESCRIPTION

Systems and methods of recording media content are provided. In a particular embodiment, a method includes accessing user configuration settings. The user configuration settings include at least one premier recording option. Selection of the premier recording option indicates that initial episodes of series programs are to be recorded. The method also includes searching electronic program guide (EPG) information for the initial episodes of series programs in response to determining that the premier recording option is selected in the user configuration settings. The method further includes storing a data record scheduling recording of a particular initial episode of a particular series program identified by searching the EPG information.

In another particular embodiment, a media recorder device includes a memory to store user configuration settings. The media recorder device also includes a scheduling module to schedule recording of media content based on the user configuration settings. The scheduling module searches electronic program guide (EPG) information to identify initial episodes of one or more series programs and schedules the identified initial episodes for recording when a record initial episodes option is selected.

In another particular embodiment, a computer-readable medium includes instructions that, when executed by a processor, cause the processor to access user configuration settings. The user configuration settings include a premier recording option. Selection of the premier recording option indicates that initial episodes of series programs are to be recorded. The computer-readable medium also includes instructions that, when executed by the processor, cause the processor to search electronic program guide (EPG) information for the initial episodes of the series programs in response to determining that the premier recording option is selected in the user configuration settings. The computer-readable medium also includes instructions that, when executed by the processor, cause the processor to store a data record to schedule recording of a particular initial episode of a particular series program identified by searching the EPG information.

Figure 1:
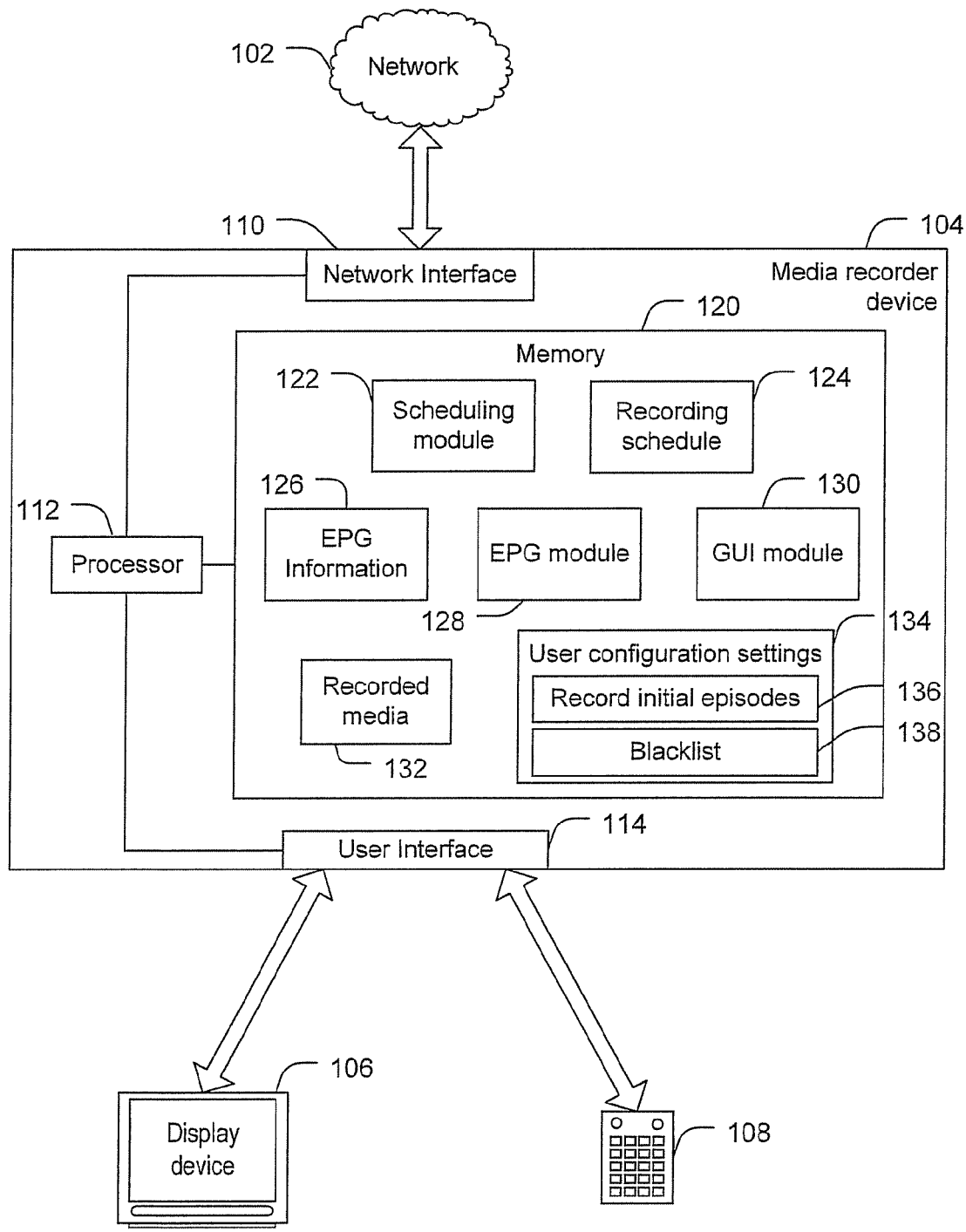
FIG. 1 is a block diagram of an embodiment of a system to record media content.

FIG. 1 depicts a particular embodiment of a system to record media content. The system includes a media recorder device 104 coupled to a network 102. Media content is sent to the media recorder device 104 via the network 102 and received at a network interface 110. The media recorder device 104 is adapted to store portions of the media content in a memory 120 as recorded media 132. Additionally the media recorder device 104 may provide media content from the network 102 or from the recorded media 132 to a display device 106. The media recorder device 104 may be controlled using input received via a user interface 114 from a remote control device 108.

In a particular embodiment, the media recorder device 104 includes a processor 112 coupled to the memory 120. The processor 112 may be adapted to implement or execute instructions stored in the memory 120. Additionally, the processor 112 may process media content received via the network 102 to provide media content to the display device 106 for display.

In a particular embodiment, the system includes a scheduling module 122. The scheduling module 122 may be adapted to schedule recording of media content based on user configuration settings 134 stored in the memory 120. For example, the scheduling module 122 may generate a data record and store the data record as a recording schedule 124 in the memory 120. Based on the recording schedule 124, the processor 112 may receive media content and store the media content at the memory 120 as the recorded media 132.

The system may also include an electronic program guide (EPG) module 128 to access an EPG server via the network 102 and to store EPG information 126 at the memory 120. The EPG module 128 may search the EPG information 126 to determine when media content scheduled for recording is available via the network 102. For example, the EPG information 126 may include identification information associated with the various programs, such as a time at which the program will be transmitted, a channel on which the program will be transmitted, descriptive information associated with the program, other information, or any combination thereof. The EPG module 128 may periodically receive updates of the EPG information 126. The updates may include changes in the scheduled programming or additional EPG information 126. The EPG information 126 may be updated on a rolling basis. For example, the EPG information 126 may include programming information covering a particular time period (e.g., one week, two weeks, one month, or some other time period). The EPG module 128 may update the EPG information 126 as new EPG information becomes available from the network 102 (e.g., daily, weekly, or at some other interval). When updated EPG information is received, the EPG module 128 may search the updated EPG information to identify media content to schedule for recording based on the user configuration settings 134.

The media recorder device 104 may also include a graphical user interface (GUI) module 130. The GUI module 130 may be adapted to provide a user interface display at the display device 106 for user interaction and input with respect to controlling the media recorder device 104. For example, the GUI module 130 may be adapted to provide a user interface display including user selectable options to configure the media recorder device 104 to store the user configurations settings 134.

In a particular embodiment, the user configuration settings 134 include a record initial episodes options 136. When the record initial episodes option is selected in the user configuration settings 134, the scheduling module 122 may search the EPG information 126 to identify initial episodes of series programs. When an initial episode of a series program is identified, the initial episode may be scheduled for recording. For example, when the user configuration settings 134 include the record initial episodes options 136, the scheduling module 122 may search the EPG information 126 to determine whether a series premier, a series pilot, or a season premier of a series program is identified within the EPG information 126. Series premiers, series pilots and series season premiers are collectively referred to herein as initial episodes of series programs. If an initial episode of a series program is identified in the EPG information 126, the scheduling module 122 may schedule the initial episode for recording.

In a particular embodiment, when the record initial episodes option 136 is selected, the scheduling module 122 searches the EPG information 126 each time the EPG information is updated in order to identify initial episodes of series programs in the updated EPG information. For example, the scheduling module 122 may search the EPG information 126 using a keyword search. To illustrate, the scheduling module 122 may search for keywords within the EPG information 126, such as "pilot," "premier," or "season premier". In another example, the EPG information 126 may include a premier flag associated with one or more programs. The premier flag may indicate that the associated program is an initial episode of a series program. The scheduling module 122 may search the EPG information 126 to identify programs associated with premier flags and schedule such programs for recording. In another example, the scheduling module 122 may compare the updated EPG information with EPG information that was previously received to determine whether one or more programs that were not identified in the previously received EPG information are identified in the updated EPG information. In various embodiments, the scheduling module 122 searches the EPG information 126 using another technique or combination of techniques. For example, the scheduling module may use a combination of a keyword search, a search for premier flags, or a comparison of previously received EPG information to updated EPG information to identify the initial episodes of the series programs.

In a particular embodiment, a user can configure the media recorder device 104 to record initial episodes of a series programs via a user interface display presented at the display device 106 by the GUI module 130. The user interface display may include a selectable record initial episodes option. Selection of the selectable record initial episodes option may cause a data record to be stored at the user configuration settings 134 indicating that the record initial episodes option was selected. The user interface display may also include options to record particular types of initial episodes, such as only series premiers, only season premiers, only series pilots, or a combination of premiers, pilots or any initial program of a series. In a particular embodiment, the user interface display may include user selectable options to prevent recording of certain initial episodes. For example, the user interface display may enable the user to specify a blacklist 138. The blacklist 138 may indicate that initial episodes of certain types of programs (e.g., programs from a particular genre) should not be recorded. To illustrate, the blacklist 138 may indicated that reality programs, sci-fi programs, comedy programs, of programs of other genres should not be recorded. In another particular embodiment, the blacklist 138 includes one or more particular program names indicating that programs with the particular program names should not be recorded. To illustrate, the user interface display may include an option to input a program name or to search for a program name in the EPG information 126. A program identified by the search may be added to the blacklist 138. In another particular embodiment, the blacklist 138 may identify a particular channel from which programs should not be recorded.

In a particular embodiment, media recorder device 104 is adapted to playback the recorded media 132 at the display device 106. The GUI module 130 may provide a user interface display for selection of particular recorded media 132 to playback. The user interface display presented for selection of the recorded media 132 to playback may include an indication of which recorded programs are initial episodes of series programs (e.g., which programs were recorded based on the recorded initial episode option 136). For example, the user interface display may distinguish premiers, pilots and season premiers from other recorded programs identified in the user interface display. To illustrate, the premiers, pilots or season premiers may be color coded, associated with a flag, or other indicator, identified in a separate list associated with premiers, season premiers and pilots, presented in some other way that distinguishes them from other programs recorded in the recorder media 132, or any combination thereof.

After selection of a particular season premier, pilot, or premier of a series program, recorded media 132 associated with the selected program may be presented at the display device 106. After presentation of at least a portion of the recorded media 132 associated with the program, the GUI module 130 may present an additional user interface display. For example, when a user stops playback of the recorded media 132 associated with the program, the user may be presented with a user interface display that includes a selectable option to control the recording of future episodes of the particular program. In a particular illustrative embodiment, the user interface display includes a selectable record future episodes option. The record future episodes option may cause future episodes of the particular series programs to be scheduled for recording by the scheduling module 122. To illustrate, after having watched at least a portion of the pilot, season premier or premier episode of a particular series program, the user may determine that he or she enjoys the program and may select the record future episodes option in order to ensure that future episodes of the particular series program are recorded. The record future episodes option may be associated with other user configuration settings 134 such as do not record reruns, record programs during a particular time slot, options for how long the program is stored at the recorded media 132, or other recording options.

In a particular embodiment, the user interface display presented after presentation of at least a portion of the recorded media associated with the program, includes a selectable blacklist future episodes options. Selection of the blacklist future episodes option may cause a record to be stored at the blacklist 138. Adding a particular program to the blacklist 138 may prohibit future episodes of the particular program from being recorded at the media recorder device 104. To illustrate, after having watched a portion of the recorded media 132 associated with the initial episode of a particular series program, the user may determine that the program is inappropriate or that he or she is otherwise unsatisfied with the program.

To prevent the program from being recorded in the future, the program may be added to the blacklist 138. The blacklist 138 may identify media content by a program name, an associated channel, a genre, other descriptive information associated with the media content, or any combination thereof.

In a particular embodiment, the processor 112 may automatically record particular media content based on the recording schedule 124. For example, at a particular time determined based on the recording schedule 124, the processor 112 may tune to a selected channel to received media content that is scheduled to be recorded. Since the recording schedule 124 may be determined automatically based on the user configuration settings 134, a user associated with the media recorder device 104 may be able to record new series programs without having to search for them manually. Additionally, the user may be able to start viewing or recording a particular series program at the beginning of a new season (e.g. at the season premier).

Figure 2:
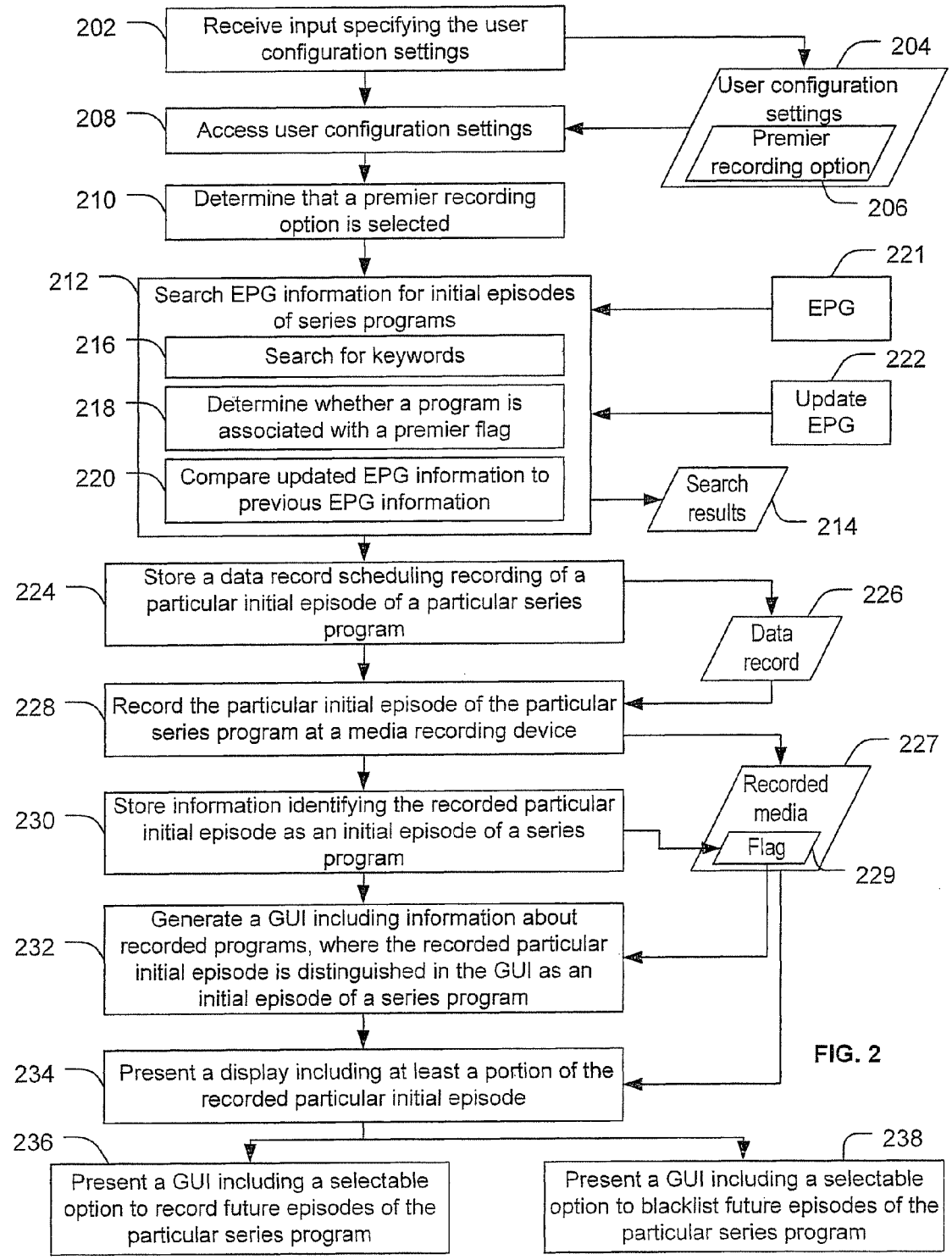
FIG. 2 is a flow chart of an embodiment of a method of recording media content.

FIG. 2 depicts a particular embodiment of a method of recording media content. The method includes, at 202, receiving input specifying user configurations settings 204. The user configuration settings 204 may be received via a graphical user interface provided by a media recording device, such as the media recorder device 104 discussed with reference to FIG. 1. In a particular embodiment, the user configuration settings 204 include a premier recording option 206. Selection of the premier recording option 206 may indicate that initial episodes of series programs are to be recorded at the media recording device. The initial episodes of series programs may include pilot episodes, premier episodes, season premier episodes, or any combination thereof.

The method also includes, at 208, accessing the user configuration settings 204, and determining that the premier recording option 206 is selected, at 210. When the premier recording option 206 is selected, the method includes, at 212, searching electronic program guide (EPG) information 221 for initial episodes of series programs. Searching the EPG information 221 may generate search results 214. In a particular embodiment, the EPG information 221 is searched using a keyword search 216. For example, the EPG information 221 may be searched for words such as "pilot", "premier", or "season premier". In another particular embodiment, the EPG information 221 is searched to determine whether any programs are associated with a premier flag. The premier flag may indicate that a program is an initial episode of a series program. In another particular embodiment, the EPG information 221 is searched by receiving updated EPG information 222 and comparing the updated EPG information 222 to the previously received EPG information 221. By comparing the updated EPG information 222 to the previously received EPG information 221, a determination may be made as to whether one or more programs that were not identified in the previously received EPG information 221 are identified in the updated EPG information 222. The search results 214 may identify initial episodes of series programs based on the search of the EPG information 221. The method may also include, at 224, storing a data record 226 scheduling recording of a particular initial episode of a particular series program, based on the search results 214.

The method may also include, at 228, recording a particular initial episode of a particular series program at the media recording device based on the data record 226. For example, the data record 226 may include an entry in a recording schedule for the media recording device. The media recording device may record programs as recorded media 227 based on the recording schedule. In a particular embodiment, the method includes, at 230, storing information that identifies the recorded media 227 as an initial episode of a series program. For example, the information identifying the recorded media 227 as an initial episode may include a flag 229 that distinguishes the recorded media 227 as an initial episode. In another example, recorded initial episodes may be stored in a designated area of the media recording device, such as a separate memory sector, or separate folder.

After an initial episode of a series program has been recorded, the method may include, at 232, generating a graphical user interface (GUI) including information about recorded programs. The information about the recorded programs may include information distinguishing the recorded initial episode in the GUI as an initial episode of a series program. For example, the information identifying the recorded initial episode may be highlighted, may be associated with the flag 229, or may be associated with a separate menu or list of programs to indicate that it is an initial episode of a series program. The method may also include, at 234, presenting a display, including at least a portion of the recorded initial episode. After presentation of at least a portion of the recorded initial episode, the method may include, at 236, presenting a GUI including a selectable option to record future episodes of the particular series program. For example, after presenting at least a portion of the recorded initial episode, the user may be presented with a GUI and given the option to record future episodes of the same series. In a particular embodiment, after presenting at least a portion of the recorded initial episode, the method includes, at 238, presenting a GUI including a selectable option to blacklist future episode of the particular series program. Blacklisting future episodes may prohibit the future episodes of the series from being recorded at the media recording device.

Figure 3:
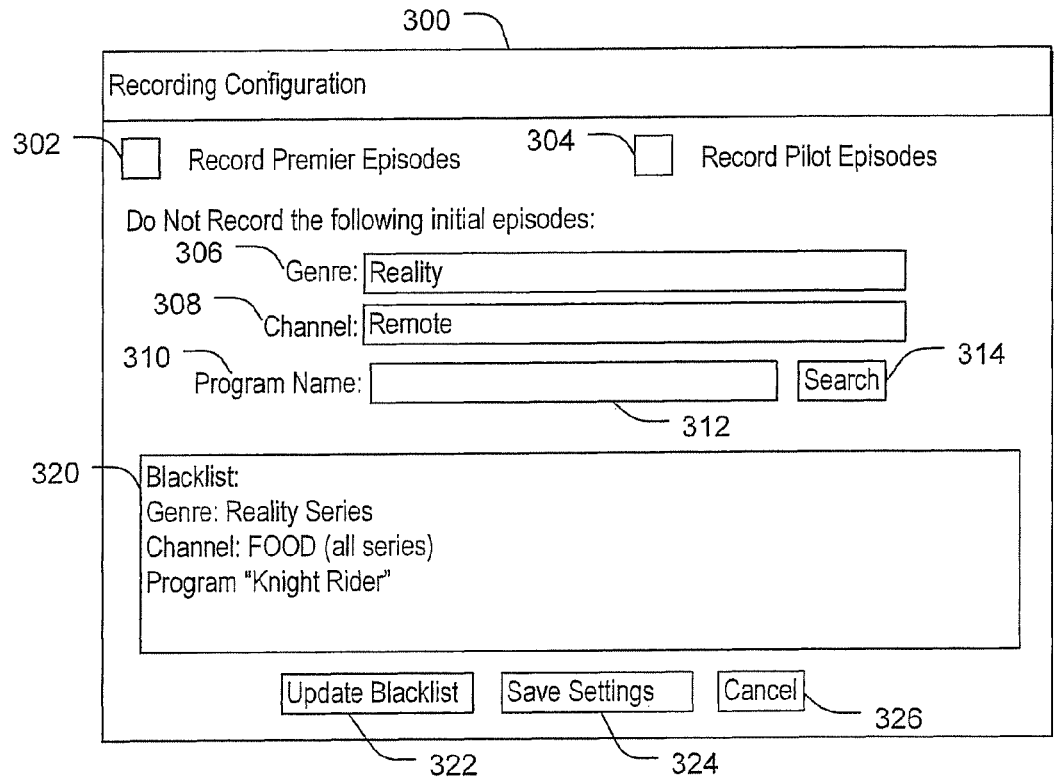
FIG. 3 is an illustration of a first embodiment of a user interface display to record media content.

FIG. 3 depicts a first particular embodiment of a user interface display associated with recording media content. The user interface display 300 includes user selectable options to configure user configuration settings. In response to selection of one or more of the user selectable options, the user configurations settings may be stored at a media recording device, such as the user configuration settings 134 stored at the media recorder device 104 as described with reference to FIG. 1.

In a particular embodiment, the user selectable options include a record premier episodes option 302. Selection of the record premier episodes option 302 may cause a user configuration record to be stored at the media recording device indicating that programs identified as premier episodes of series programs should be recorded at the media recording device. The user selectable options may also include a record pilot episodes option 304. Selection of the record pilot episodes option 304 may cause a data record to be stored at the user configuration settings of the media recording device indicating that programs identified as pilot episodes of series programs should be recorded at the media recording device. In a particular embodiment, a single user selectable option indicating recording of all types of initial episodes of series programs (e.g., pilots, premiers, season premiers, and so forth) is presented in the user interface display 300. Selection of the single record initial episodes option may indicate that all types of initial episodes of series programs are to be recorded at the media recording device.

The user interface display 300 may also include one or more user selectable options to specify programs that are not to be recorded at the media recording device, such as blacklist options. The blacklist options may include a user selectable option related to a genre or type of program, such as genre option 306. Selection of the genre option 306 may allow a user to indicate that initial episodes of series programs associated with a particular genre are not to be recorded. For example, the user may specify that all premiers are to be recorded except for premiers of reality programs. The blacklist options may also include a user selectable channel option 308. Selection of the user selectable channel option 308 may indicate that initial episodes of series programs on a particular channel are not to be recorded. The black list options may also include a user selectable program name option 310. The user selectable program name option 310 may allow a user to specify a particular program the initial episodes of which are not to be recorded at the media recording device. In a particular embodiment, the user selectable program name option 310 is associated with a text entry box 312 in which the user may input a program name or other search term. The user selectable program name option 310 may also be associated with a search feature 314. The search feature 314 may enable the user to search for a particular program to be added to a blacklist 320. Initial episodes of programs identified in the blacklist 320 are not to be recorded at the media recording device. In a particular embodiment, the blacklist 320 is displayed at the user interface display 300. Additionally, after selection of a blacklist option, the blacklist 320 may be updated by selection of an update blacklist option 322. When a user has finished making selections via the user interface display 300, the selections may be saved in the user configuration settings by selection of a saved settings options 324, or the selections may be cancelled by selection of the cancel option 326.

Figure 4:
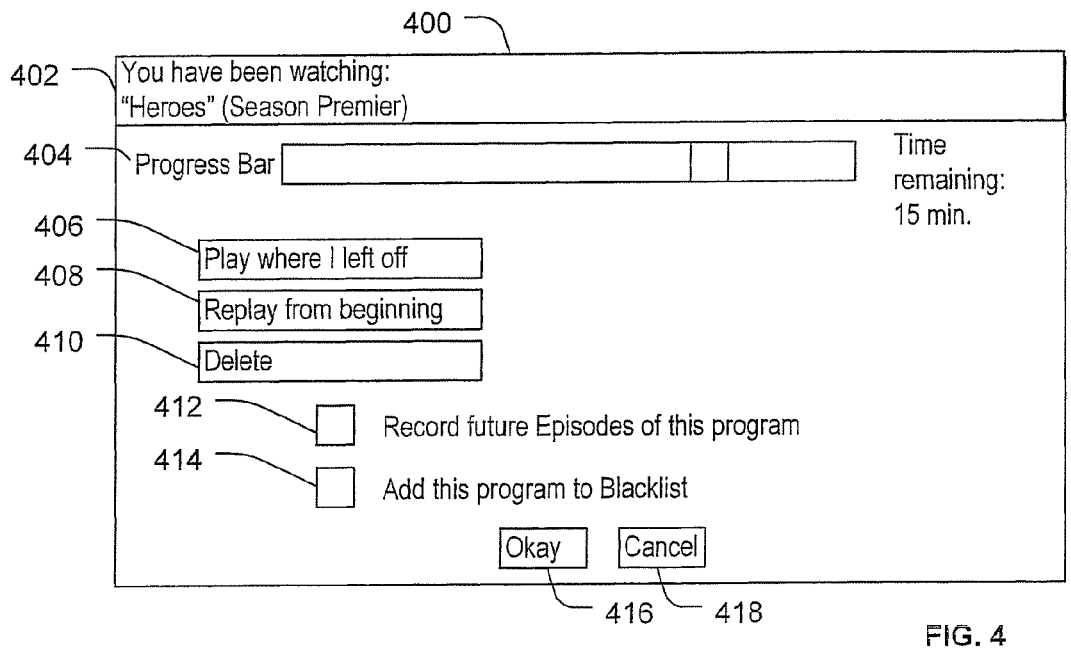
FIG. 4 is an illustration of a second embodiment of a user interface display to record media content.

FIG. 4 depicts a second particular embodiment of a user interface display associated with recording media content. The user interface display 400 may be presented after presentation of at least a portion of media content of a recorded initial episode of a series program. For example, the user interface display 400 may be presented when a user stops playback of a recorded program or after the recorded program ends. The user interface display 400 includes a title bar 402 that identifies the program. The title bar 402 (or another portion of the user interface display 400) may include information identifying the recorded program as an initial episode of a series program. For example, as illustrated in FIG. 4, the title bar 402 indicates that the user has been watching a season premier of the series program "Heroes".

The user interface display 400 may also include a progress bar 404. The progress bar 404 may provide a graphical indication of a portion of the recorded program that has been viewed and a portion of the recorded program that remains. Additionally, the progress bar 404 may include an indication of amount of time remaining in the recorded program. The user interface display 400 may also include user selectable options to control viewing of the recorded program, such as a play where I left off option 406 to begin playback of the recorded program where the user left the program; a replay from beginning option 408 to replay the recorded program from the beginning; and a delete option 410 to delete the recorded program.

In a particular embodiment, the user interface display 400 includes user selectable options to control recording of future episodes of the particular program. For example, the user interface display 400 may include a record future episodes of this program option 412. Selection of the record future episodes of this program option 412 may cause the media recording device to store a data record that indicates that future episodes of the particular series program should be scheduled for recording. In another example, the user interface display may include an add this program to blacklist option 414. Selection of the add this program to blacklist option 414 may cause the media recording device to store a data record indicating that future episodes of the particular series program should not be recorded at the media recording device. The user interface display 400 may also include user selectable options to cancel changes that have been made in the display, such as cancel option 418, or to save changes that have been made in the display, such as okay option 416.

FIG. 5 illustrates a particular embodiment of a user interface display associated with recording media content. The user interface display 500 includes a recorded programs list. The recorded programs list includes a plurality of entries identifying programs recorded at a media recording device. For example, as illustrated, the entries include a first entry 502 for a program entitled "The Office", a second entry 504 for a program entitled "Heroes", a third entry 506 for a program entitled "Fringe", and a fourth entry 508 for a program entitled "Oprah's Big Give". The recorded program list may also include descriptive information associated with the recorded programs, such as a genre of the programs, a length or duration of the programs, a date and time that each program was recorded, whether a program has been viewed since it was recorded, and so forth.

In a particular embodiment, the user interface display 500 includes information that distinguishes initial episodes of series programs in the recorded program list. For example, initial episodes of series programs may be distinguished by descriptive program information. To illustrate, the descriptive program information may include an episode number 522. The episode number 522 may indicate that the particular program is the first episode of a series program. In another particular embodiment, initial episodes are associated with descriptive information that distinguishes them as initial episodes. For example, descriptive information 520 associated with third entry 506 indicates that the third entry is a "pilot" episode of the series. In another particular embodiment, the initial episodes are indicated to be initial episodes by being associated with a flag, such as a pilot flag 524 or a season premier flag 526. In other embodiments, the initial episodes are distinguished in the user interface display 500 by being associated with a separate menu (not shown) such as a recorded program list associated solely with initial episodes of series programs. In yet another particular embodiment, the initial episodes may be distinguished based on a color coding associated with the initial episodes.

Figure 6:
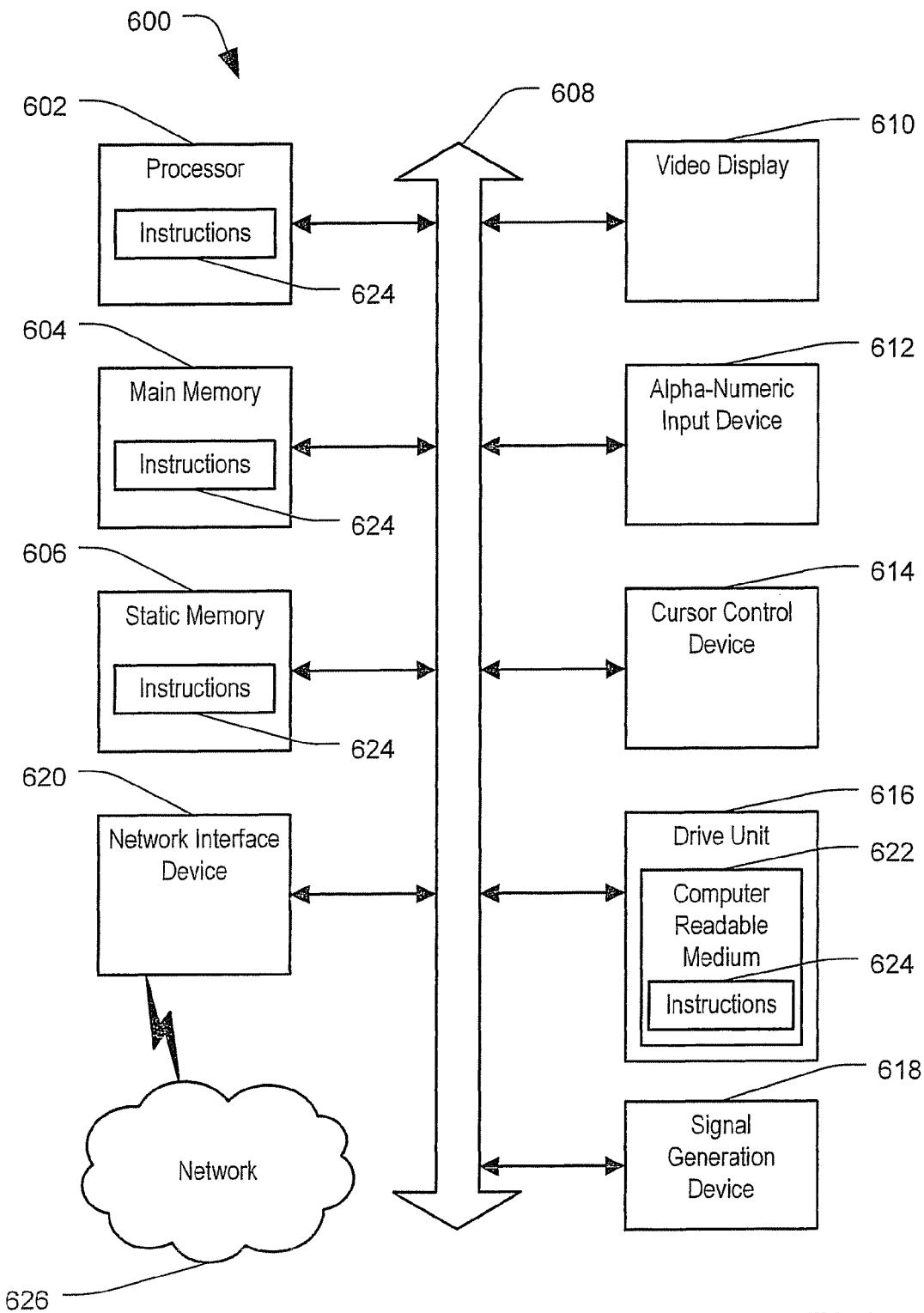
FIG. 6 is a block diagram of an illustrative general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within the media recorder device 104 discussed with reference to FIG. 1.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse or remote control. The computer system 600 can also include a disk drive unit 616, a signal generation device 618, such as a speaker, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   presenting, to a display device from a media recording device, a first graphical user interface that includes a selectable record season premieres option, selectable record pilots option, and a view recorded programs option, wherein selection of the record season premieres option indicates that only season premieres are to be recorded, and wherein selection of the record pilots option indicates that only pilot episodes are to be recorded;
   in response to a selection of the record season premieres option, searching electronic program guide information to identify season premieres;
   in response to identifying a particular season premiere based on the search of the electronic program guide information, storing a data record scheduling recording of the particular season premiere, wherein the particular season premiere is part of a particular series program that includes at least one subsequent episode, and wherein the at least one subsequent episode is not scheduled for recording;
   recording the particular season premiere at the media recording device based on the data record;
   generating a recorded programs list in response to a selection of the view recorded programs option, wherein the recorded programs list is associated with all recorded programs, wherein recorded season premieres are displayed in a second recorded programs list in a first color and recorded non-season premieres are displayed in the second recorded programs list in a second color that is distinct from the first color;
   presenting at least a portion of the recorded particular season premiere; and
   after presenting at least the portion of the recorded particular season premiere, presenting a second graphical user interface that includes a selectable option to schedule recording of the at least one subsequent episode of the particular series program that was not recorded in response to the selection of the selectable record season premieres option, wherein the second graphical user interface does not include the selectable record season premieres option.

2. The method of claim 1, wherein searching the electronic program guide information comprises searching the electronic program guide information for keywords that are associated with the season premieres.

3. The method of claim 2, wherein the keywords include at least one of pilot and premiere.

4. The method of claim 1, wherein searching the electronic program guide information includes determining whether a program identified in the electronic program guide information is associated with a premiere flag, wherein the premiere flag indicates that the program is a season premiere.

5. The method of claim 1, further comprising searching the electronic program guide information each time the electronic program guide information is updated.

6. The method of claim 1, further comprising:
   receiving updated electronic program guide information;
   determining whether one or more programs that were not identified as season premieres in the electronic program guide information are identified as season premieres in the updated electronic program guide information based on a comparison of the updated electronic program guide information to the electronic program guide information; and
   in response to determining that at least one of the one or more programs is identified as a season premiere in the updated electronic program guide, storing a second data record scheduling recording of the at least one of the one or more programs.

7. The method of claim 1, wherein the season premieres include at least one of a series premiere, and a series season premiere, and wherein the pilot episodes include at least a series pilot.

8. The method of claim 1, further comprising storing information indicating that the recorded particular season premiere is a season premiere of a series program.

9. The method of claim 1, wherein the second graphical user interface includes a selectable option to blacklist the at least one subsequent episode of the particular series program, wherein blacklisting the at least one subsequent episode prohibits the at least one subsequent episode from being recorded at the media recording device.

10. A media recorder device, comprising:
    a memory to store user configuration settings;
    a graphical user interface module configured to:
       generate a user interface display comprising a record season premieres option, a record pilots option, and a view recorded programs option; and
       generate a recorded programs list in response to a selection of the view recorded programs option, wherein the recorded programs list is associated with all recorded programs, wherein recorded season premieres are displayed in a second recorded programs list in a first color and recorded non-season premieres are displayed in the second recorded programs list in a second color that is distinct from the first color; and
       generate a second user interface display that includes a selectable record future episodes option after presentation of at least a portion of a recorded season premiere of a particular series program, wherein, in response to a selection of the selectable record future episodes option, the scheduling module is configured to schedule at least subsequent episode of the particular series program for recording, wherein the second user interface display does not include the record season premieres option and the record pilots option; and
    a scheduling module configured to schedule recording of media content based on the user configuration settings, wherein when the record season premieres option is selected, the scheduling module searches electronic program guide information to identify season premieres of one or more series programs and schedules only the identified season premieres for recording, wherein the series program includes at least one subsequent episode, wherein the at least one subsequent episode is not scheduled for recording, and wherein when the record pilots option is selected, the scheduling module searches electronic program guide information to identify pilot episodes and schedules only the identified pilot episodes for recording.

11. The media recorder device of claim 10, further comprising an electronic program guide module configured to periodically update the electronic program guide information.

12. The media recorder device of claim 11, wherein the scheduling module is further configured to search the electronic program guide information to identify the season premieres of the one or more series programs in response to updating the electronic program guide information.

13. The media recorder device of claim 10, wherein the graphical user interface module and the scheduling module comprise instructions stored in the memory, and further comprising a processor configured to execute the instructions.

14. The media recorder of claim 10, further comprising a display device coupled to the media recorder device to receive and display the user interface display.

15. The media recorder of claim 10, wherein the memory includes blacklist data, wherein episodes of a program identified in the blacklist data are inhibited from being scheduled to be recorded.

16. A computer-readable storage device comprising instructions that, when executed by a processor, cause the processor to perform operations comprising:
- accessing user configuration settings, wherein the user configuration settings include a premiere recording option and a record pilots option, wherein selection of the premiere recording option indicates that only season premieres of one or more series programs are to be recorded, and wherein selection of the record pilots option indicates that only pilot episodes are to be recorded;
- searching electronic program guide information for the season premieres of the one or more series programs in response to determining that the premiere recording option is selected in the user configuration settings;
- storing a data record to schedule recording of a particular season premiere of a particular series program identified by searching the electronic program guide information, wherein the particular series program includes at least one subsequent episode, and wherein the at least one subsequent episode is not scheduled for recording;
- recording the particular season premiere at a media recording device based on the data record, wherein the recorded particular season premiere is stored in a portion of the media recording device dedicated to storing recorded season premieres;
- generating a recorded programs list in response to a selection of a view recorded programs option, wherein the recorded programs list is associated with all recorded programs, wherein recorded season premieres are displayed in a second recorded programs list in a first color and recorded non-season premieres are displayed in the second recorded programs list in a second color that is distinct from the first color;
- presenting at least a portion of the recorded particular season premiere; and
- after presenting at least the portion of the recorded particular season premiere, presenting a second graphical user interface that includes a selectable option to schedule recording of the at least one subsequent episode of the particular series program that was not recorded in response to the selection of the selectable record season premieres option, wherein the second graphical user interface does not include the selectable record season premieres option.

17. The computer-readable storage device of claim 16, wherein the user configuration settings include blacklist data, wherein the blacklist data includes information identifying at least one series program that is not to be scheduled for recording.

18. The computer-readable storage device of claim 17, wherein the blacklist data includes one or more genre designators, wherein the one or more genre designators identify genres of series programs that are not to be scheduled for recording.

19. The non transitory computer-readable storage device of claim 17, wherein the blacklist data includes one or more program names, wherein the one or more program names identify particular series programs that are not to be scheduled for recording.

20. The computer-readable storage device of claim 17, wherein the blacklist data includes information identifying one or more channels on which season premieres of series programs are not to be scheduled for recording.

21. The computer-readable storage device of claim 16, wherein searching the electronic program guide information for the season premieres comprises searching the electronic program information for keywords associated with the season premieres.

22. The computer-readable storage device of claim 16, wherein the operations further comprise sending the recorded programs list to a display device.

23. The computer-readable storage device of claim 16, wherein the operations further comprise sending the second recorded programs list to a display device.

* * * * *

UNITED STATES PATENT AND TRADEMARK OFFICE
CERTIFICATE OF CORRECTION

PATENT NO.       : 8,555,320 B2
APPLICATION NO.  : 12/276155
DATED            : October 8, 2013
INVENTOR(S)      : Larry G. Kent et al.

Page 1 of 1

It is certified that error appears in the above-identified patent and that said Letters Patent is hereby corrected as shown below:

In the Claims

Column 14, Line 35 (Claim 19, Line 1) "The non transitory computer-readable storage device of" should read --The computer-readable storage device of--.

Signed and Sealed this
Eleventh Day of March, 2014

Michelle K. Lee
*Deputy Director of the United States Patent and Trademark Office*